(12) United States Patent
Paperi

(10) Patent No.: US 11,639,039 B1
(45) Date of Patent: May 2, 2023

(54) MATCHING PIECES AND KITS FOR REPAIRING BROKEN STRUCTURES AND RELATED METHODS

(71) Applicant: Maurice Paperi, Macomb, MI (US)

(72) Inventor: Maurice Paperi, Macomb, MI (US)

(73) Assignee: Maurice Paperi, Macomb, MI (US)

( * ) Notice: Subject to any disclaimer, the term of this patent is extended or adjusted under 35 U.S.C. 154(b) by 0 days.

(21) Appl. No.: 15/425,189

(22) Filed: Feb. 6, 2017

Related U.S. Application Data

(60) Provisional application No. 62/291,176, filed on Feb. 4, 2016.

(51) Int. Cl.
| | |
|---|---|
| *B60R 11/00* | (2006.01) |
| *B60Q 1/04* | (2006.01) |
| *B29C 73/04* | (2006.01) |
| *B33Y 10/00* | (2015.01) |
| *B33Y 80/00* | (2015.01) |
| *B33Y 50/00* | (2015.01) |
| *B23P 6/00* | (2006.01) |
| *B29C 64/386* | (2017.01) |

(52) U.S. Cl.
CPC .............. *B29C 73/04* (2013.01); *B23P 6/00* (2013.01); *B29C 64/386* (2017.08); *B33Y 10/00* (2014.12); *B33Y 50/00* (2014.12); *B33Y 80/00* (2014.12); *B23P 2700/50* (2013.01)

(58) Field of Classification Search
None
See application file for complete search history.

(56) References Cited

U.S. PATENT DOCUMENTS

| | | |
|---|---|---|
| 2,797,967 A | 7/1957 | Irvin |
| 2,883,228 A | 4/1959 | Roberts |
| 3,377,525 A | 4/1968 | Bradstock |
| 3,425,657 A | 2/1969 | Doyle |
| 3,611,864 A | 10/1971 | Buckley |
| 4,193,621 A | 3/1980 | Peichl et al. |
| 4,243,196 A | 1/1981 | Toda et al. |
| 4,270,328 A | 6/1981 | Page et al. |
| 4,742,435 A | 5/1988 | Duyn et al. |
| 4,751,619 A | 6/1988 | Philippe et al. |
| 4,947,306 A | 8/1990 | O'Shaughnessey |
| 5,202,568 A | 4/1993 | Woods |
| 5,230,130 A * | 7/1993 | Bishop ................. B60Q 1/0064 156/94 |
| 5,408,391 A | 4/1995 | Denley |
| 5,454,543 A | 10/1995 | Carrico |
| 5,566,057 A | 10/1996 | Iwami |
| 5,597,980 A | 1/1997 | Weber |
| 5,601,676 A * | 2/1997 | Zimmerman ....... B29C 66/1142 156/304.3 |
| 5,612,516 A | 3/1997 | Valitutti et al. |

(Continued)

OTHER PUBLICATIONS

Stefan Menin, Working with Dimensional Tolerances, May 10, 2012, MachineDesign (Year: 2012).*

(Continued)

*Primary Examiner* — Mary I Omori
(74) *Attorney, Agent, or Firm* — Elevated IP, LLC

(57) ABSTRACT

Matching pieces for broken structures, kits comprising matching pieces for broken structures, methods for generating 3-D models for matching pieces, methods for fabricating matching pieces, systems for generating 3-D models for matching pieces, and systems for fabricating matching pieces are disclosed.

13 Claims, 10 Drawing Sheets

(56) References Cited

U.S. PATENT DOCUMENTS

| | | | |
|---|---|---|---|
| 6,101,087 A | 8/2000 | Sutton et al. | |
| 6,106,122 A | 8/2000 | Gilbert et al. | |
| 6,109,586 A | 8/2000 | Hoek | |
| 6,120,170 A | 9/2000 | Hamelbeck | |
| 6,135,619 A | 10/2000 | Camacho et al. | |
| 6,197,397 B1 * | 3/2001 | Sher | C09J 5/08 |
| | | | 428/42.3 |
| 6,216,691 B1 | 4/2001 | Kenyon et al. | |
| 6,239,928 B1 | 5/2001 | Whitehead et al. | |
| 6,250,148 B1 | 6/2001 | Lynam | |
| 6,326,613 B1 | 12/2001 | Heslin et al. | |
| 6,336,671 B1 | 1/2002 | Leonardi | |
| 6,357,811 B1 | 3/2002 | Nakamura et al. | |
| 6,471,386 B2 | 10/2002 | Oh | |
| 6,523,886 B2 | 2/2003 | Hoffner et al. | |
| 6,554,461 B2 | 4/2003 | Kamada et al. | |
| 6,637,900 B2 | 10/2003 | Ohashi | |
| 6,908,127 B2 | 6/2005 | Evans | |
| 6,916,100 B2 | 7/2005 | Pavao | |
| 7,014,257 B2 | 3/2006 | Lazzeroni et al. | |
| 7,083,207 B2 | 8/2006 | Matsuzawa | |
| 7,140,760 B2 | 11/2006 | Kidd | |
| 7,207,617 B2 | 4/2007 | Pelini | |
| 7,252,422 B2 | 8/2007 | Kim | |
| 7,419,206 B2 | 9/2008 | Slobodecki et al. | |
| 7,520,693 B2 | 4/2009 | Werman et al. | |
| 7,540,550 B1 | 6/2009 | Huber et al. | |
| 7,954,976 B1 | 6/2011 | Berge | |
| 7,975,350 B2 | 7/2011 | Nagami | |
| 8,136,971 B2 * | 3/2012 | Hartman | B29C 73/02 |
| | | | 362/362 |
| 8,207,836 B2 | 6/2012 | Nugent | |
| 8,226,133 B2 | 7/2012 | Sano | |
| 8,256,821 B2 | 9/2012 | Lawlor et al. | |
| 8,302,717 B2 | 11/2012 | Mizuta | |
| 8,342,702 B2 | 1/2013 | Ohe | |
| 8,371,411 B2 | 2/2013 | Kawaguchi et al. | |
| 8,414,069 B1 | 4/2013 | Contardi et al. | |
| 8,454,211 B2 | 6/2013 | Todaka et al. | |
| 8,550,510 B2 | 10/2013 | Mizoguchi et al. | |
| 8,567,853 B2 | 10/2013 | Huber et al. | |
| 8,576,138 B2 | 11/2013 | Suzuki et al. | |
| 8,585,266 B2 | 11/2013 | Kersting et al. | |
| 8,720,975 B1 | 5/2014 | Perez et al. | |
| 8,754,943 B2 | 6/2014 | Klaemer et al. | |
| 8,814,394 B2 | 8/2014 | Aquilina et al. | |
| 8,820,449 B2 | 9/2014 | Nakashima | |
| 9,079,537 B2 | 7/2015 | Niessen et al. | |
| 9,090,213 B2 | 7/2015 | Lawlor et al. | |
| 9,126,291 B1 | 9/2015 | Thrasher | |
| 9,156,418 B2 | 10/2015 | Ramoutar et al. | |
| 9,156,419 B2 | 10/2015 | Yotsunaga et al. | |
| 9,169,966 B2 | 10/2015 | Schaffer et al. | |
| 9,221,387 B1 * | 12/2015 | Thorpe | B60Q 1/0491 |
| 9,340,158 B2 | 5/2016 | Nishimura et al. | |
| 9,365,245 B2 | 6/2016 | Donabedian et al. | |
| 9,371,094 B1 * | 6/2016 | Ferauche | B62D 27/023 |
| 9,422,007 B2 | 8/2016 | Suzuki et al. | |
| 9,428,112 B2 | 8/2016 | Eto et al. | |
| 9,463,834 B2 | 10/2016 | Brueckner et al. | |
| 9,539,934 B2 | 1/2017 | Fortin et al. | |
| 9,596,387 B2 | 3/2017 | Achenbach et al. | |
| 9,623,801 B2 | 4/2017 | Jeon et al. | |
| 9,669,762 B2 | 6/2017 | Pearson et al. | |
| 9,695,975 B2 | 7/2017 | Ogawa | |
| 9,773,601 B2 | 9/2017 | Breiwa et al. | |
| 9,850,936 B2 | 12/2017 | Tanabe | |
| 9,908,483 B2 | 3/2018 | Horneck | |
| 9,944,219 B2 | 4/2018 | Lakatos et al. | |
| 10,093,272 B1 | 10/2018 | Shen et al. | |
| 10,148,004 B2 | 12/2018 | Taira | |
| 10,315,596 B2 | 6/2019 | Kuji et al. | |
| 10,369,945 B2 | 8/2019 | Gruebl et al. | |
| 10,518,714 B2 | 12/2019 | Masanek, Jr. | |
| 10,549,706 B2 | 2/2020 | Syed et al. | |
| 10,648,635 B1 | 5/2020 | Ford | |
| 2002/0145881 A1 * | 10/2002 | Yamada | B60Q 1/0433 |
| | | | 362/507 |
| 2003/0097728 A1 | 5/2003 | Tisol et al. | |
| 2003/0098908 A1 | 5/2003 | Misaiji et al. | |
| 2005/0074276 A1 | 4/2005 | Luetze et al. | |
| 2005/0083596 A1 | 4/2005 | Jang | |
| 2006/0255082 A1 | 11/2006 | Tsai | |
| 2007/0256776 A1 * | 11/2007 | Keicher | B29C 73/04 |
| | | | 156/94 |
| 2010/0128458 A1 | 5/2010 | Nagami | |
| 2011/0318091 A1 | 12/2011 | Costabel et al. | |
| 2012/0013741 A1 | 1/2012 | Blake, III et al. | |
| 2012/0074283 A1 | 3/2012 | Tanno | |
| 2012/0076680 A1 | 3/2012 | Bahmata et al. | |
| 2012/0086237 A1 | 4/2012 | Raulf et al. | |
| 2012/0106181 A1 | 5/2012 | DeRouin et al. | |
| 2012/0235009 A1 | 9/2012 | Horie et al. | |
| 2012/0294027 A1 | 11/2012 | Merriman | |
| 2014/0084609 A1 | 3/2014 | Momii et al. | |
| 2014/0169020 A1 | 6/2014 | Aquilina et al. | |
| 2014/0177258 A1 | 6/2014 | Gebhard et al. | |
| 2014/0204218 A1 | 7/2014 | Gebhard et al. | |
| 2015/0021942 A1 * | 1/2015 | Evans | B60R 19/50 |
| | | | 293/142 |
| 2015/0047167 A1 * | 2/2015 | Gonzalez, III | B60Q 1/0433 |
| | | | 29/402.08 |
| 2015/0102616 A1 | 4/2015 | Yotsunaga et al. | |
| 2015/0210206 A1 * | 7/2015 | Alavandi | B60Q 1/0491 |
| | | | 29/525.01 |
| 2015/0231950 A1 | 8/2015 | Bender | |
| 2015/0251605 A1 | 9/2015 | Uken et al. | |
| 2015/0291114 A1 | 10/2015 | Borde | |
| 2016/0009230 A1 | 1/2016 | Miyado et al. | |
| 2016/0039157 A1 * | 2/2016 | Huang | B29C 65/1477 |
| | | | 156/94 |
| 2016/0121585 A1 * | 5/2016 | Jennings | C08J 5/121 |
| | | | 156/94 |
| 2016/0121836 A1 | 5/2016 | Yamamoto | |
| 2016/0215963 A1 | 7/2016 | Dubose et al. | |
| 2017/0113632 A1 | 4/2017 | Dickinson et al. | |
| 2017/0136938 A1 | 5/2017 | Lakatos et al. | |
| 2017/0182950 A1 | 6/2017 | Miyazaki et al. | |
| 2017/0305334 A1 | 10/2017 | Vincent et al. | |
| 2017/0368770 A1 | 12/2017 | Harrier et al. | |
| 2018/0009365 A1 | 1/2018 | Rubia et al. | |
| 2018/0065571 A1 | 3/2018 | Hart | |
| 2018/0070178 A1 | 3/2018 | Tabbert et al. | |
| 2018/0100535 A1 | 4/2018 | Tashiro et al. | |
| 2018/0170282 A1 | 6/2018 | Lee et al. | |
| 2018/0170437 A1 | 6/2018 | Park et al. | |
| 2018/0180083 A1 | 6/2018 | Marco et al. | |
| 2018/0195834 A1 | 7/2018 | Tedder et al. | |
| 2018/0244225 A1 | 8/2018 | Nakayama | |
| 2018/0244227 A1 | 8/2018 | Miller | |
| 2018/0297507 A1 | 10/2018 | Patak | |
| 2018/0297538 A1 | 10/2018 | Koulas | |
| 2018/0304544 A1 | 10/2018 | Ii | |
| 2018/0340317 A1 | 11/2018 | Voetter et al. | |
| 2019/0077297 A1 | 3/2019 | Kueppers et al. | |
| 2019/0126850 A1 | 5/2019 | Hallack et al. | |
| 2019/0256010 A1 | 8/2019 | Baba et al. | |
| 2019/0270422 A1 | 9/2019 | Isomura | |
| 2019/0275953 A1 | 9/2019 | Mori et al. | |
| 2019/0291632 A1 | 9/2019 | Paperi | |
| 2019/0308566 A1 | 10/2019 | Blom et al. | |
| 2019/0322223 A1 | 10/2019 | Hancock et al. | |
| 2019/0322232 A1 | 10/2019 | Yagame | |
| 2019/0339593 A1 | 11/2019 | Mayville | |
| 2019/0344728 A1 | 11/2019 | Linan et al. | |
| 2019/0366963 A1 | 12/2019 | Kumashiro et al. | |
| 2019/0369664 A1 | 12/2019 | Peters et al. | |
| 2019/0381948 A1 | 12/2019 | Portuallo et al. | |

OTHER PUBLICATIONS

Matt Grasson, New Lightweight Honeycomb Structure, Apr. 13, 2010, Aerospace Manufacturing and Design (Year: 2010).*

(56) References Cited

OTHER PUBLICATIONS

Thermoplastics vs Thermoset, Jan. 15, 2016, Star Thermoplastics (Year: 2016).*
"Company's 3D-printed replacement headlight tab kits verified by CAPA" (Repairer Driven News) Sep. 26, 2019; retrieved from internet Dec. 23, 2019.
International Search Report and Written Opinion for PCT/US19/59614 dated Jan. 24, 2020.

* cited by examiner

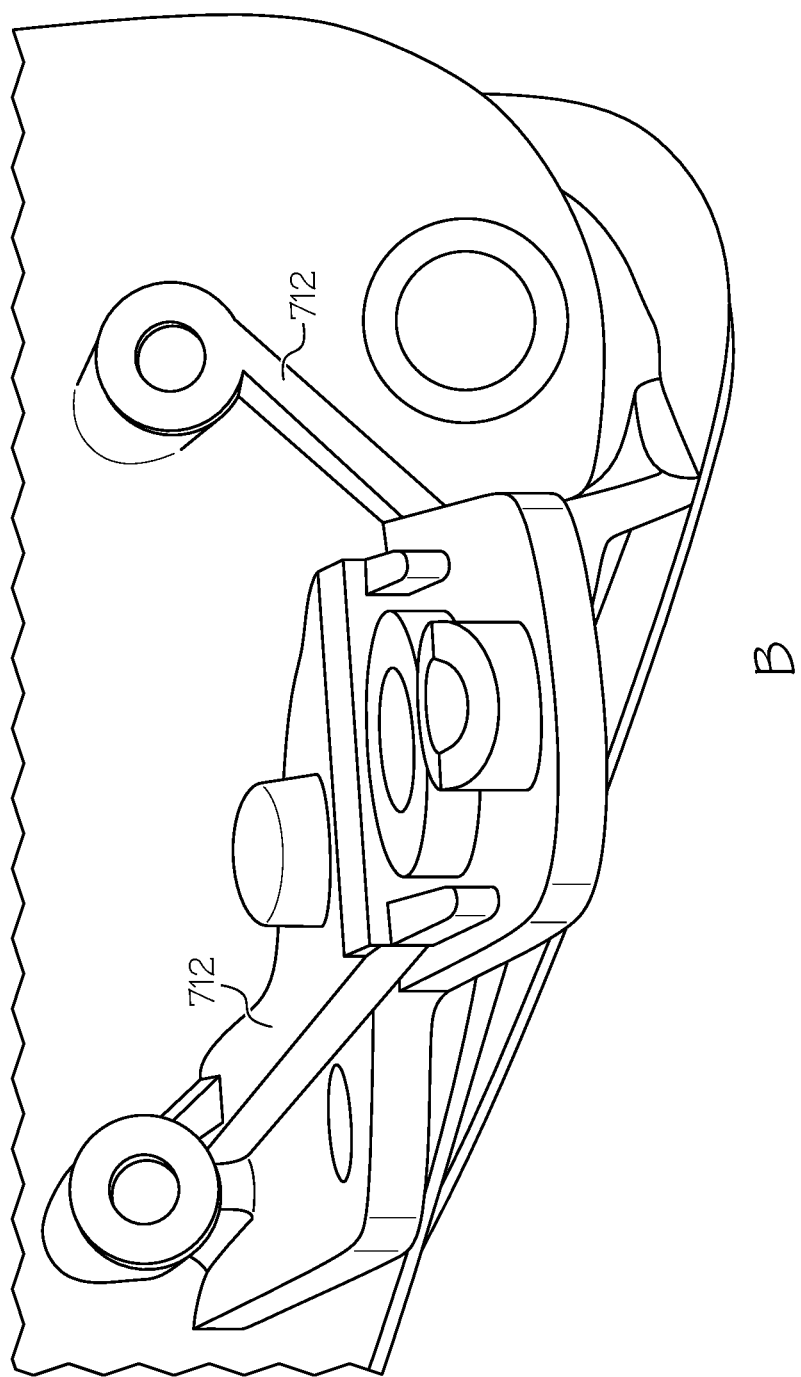

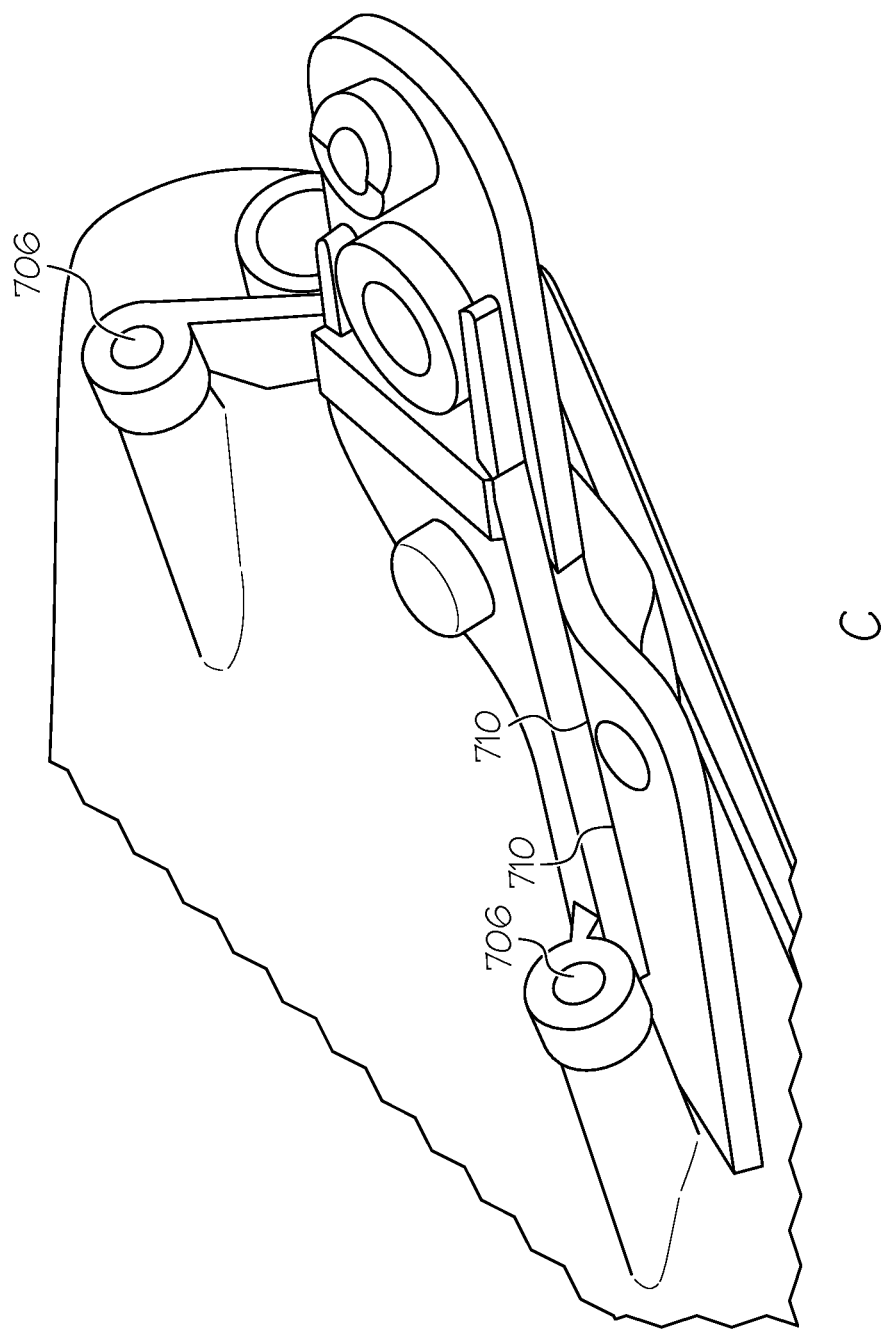

MATCHING PIECES AND KITS FOR REPAIRING BROKEN STRUCTURES AND RELATED METHODS

CROSS-REFERENCE TO RELATED APPLICATIONS

This application claims the benefit of and priority to U.S. Provisional Patent Application No. 62/291,176, filed Feb. 4, 2016, which is hereby incorporated by reference in its entirety.

BACKGROUND

Numerous products break each year, and many require repair in order to restore functionality and aesthetic appeal, replace value and/or meet safety standards. In many cases, "repair" of the broken products involves replacing a broken component with a new component, rather than fixing the broken component, which is not only costly; it is also wasteful.

SUMMARY

The present invention provides matching pieces, kits and methods for fixing or repairing broken structures or components. The matching pieces, kits and methods disclosed herein are particularly well suited for the repair of high value components, including vehicle components for automobiles, aircraft, watercraft, and human-powered vehicles (bicycles, kayaks, canoes, etc.). In embodiments, vehicle headlight/tail light casings; interior light casings; dashboards; glove boxes; compartment hatches; aesthetically wrapped components, such as steering wheels, shift knobs and sun visors; and other fastening features of cockpit and body components, may be repaired by the systems and methods disclosed. Particularly, any plastic or metal component where surface finish is not visible or critical may be repaired by the systems and methods disclosed herein.

In an aspect, the invention relates to a matching piece for a broken structure. In an embodiment, the matching piece comprises at least one surface having a predetermined surface topography for interfacing with an irregular surface of a broken structure. In an embodiment, the at least one surface and the irregular surface are contactable with a mean tolerance less than or equal to 0.015 inches. In some embodiments, the at least one surface and the irregular surface are contactable with a mean tolerance less than or equal to 0.01 inches, or less than or equal to 0.005 inches, or less than or equal to a 0.003 inches.

In an embodiment, a matching piece comprises one or more anchor features for mating with a proximate feature of a broken structure.

In an embodiment, a matching piece comprises a material selected from the group consisting of a thermoplastic, a photopolymer resin, an elastomer, a metal, a metal alloy and combinations thereof.

In an embodiment, a matching piece forms or is configured to form part of a vehicle component. For example, the matching piece may form part of a structure selected from the group consisting of a vehicle headlight casing, a vehicle tail light casing, an interior light casing, a dashboard, a glove box, a compartment hatch, a steering wheel, a shift knob and a sun visor.

In an aspect, the invention relates to a kit for repairing a broken structure. The kit comprises a matching piece for a broken structure, the matching piece comprising at least one surface having a predetermined surface topography for interfacing with an irregular surface of a broken structure, and instructions for joining the matching piece with the broken structure. In an embodiment, the at least one surface and the irregular surface are contactable with a mean tolerance less than or equal to 0.015 inches.

In an embodiment, a matching piece of the kit comprises one or more anchor features for mating with a proximate feature of a broken structure, and the instructions comprise a unique description for joining the matching piece with the broken structure, wherein the unique description is specific to the one or more anchor features and the one or more proximate features. The unique descriptions result because structures, even similar structures, will break differently under different forces and the location(s) of proximate features of the broken structure will varying (at least slightly) for each break. Thus, the instructions for joining the matching piece with the broken structure will include unique schematics and/or verbiage.

In an aspect, a method for generating a 3-D model for a matching piece comprises obtaining data from a three-dimensional (3-D) scan of at least a portion of a structure where a piece of the structure has broken off and comparing the scan data against known 3-D model data for the structure to create a 3-D model for a matching piece.

In an embodiment, the step of comparing the scan data against the known 3-D model data comprises subtracting the scan data from the known 3-D model data.

In an embodiment, a method for generating a 3-D model for a matching piece further comprises a step of fabricating the matching piece according to the 3-D model for the matching piece. For example, the step of fabricating may be selected from the group consisting of additive manufacturing, subtractive manufacturing, CNC machining, laser etching and combinations thereof.

In an embodiment, the step of fabricating is performed by additive manufacturing over a period of 10 minutes to 90 minutes, or 10 minutes to 60 minutes, or 10 minutes to 30 minutes for small matching pieces and 2 days to 3 weeks, or 2 days to 2 weeks, or 2 days to 5 days for large matching pieces, for example, having dimensions of approximately two cubic feet. Generally, the rate of additive manufacturing varies with the technology, piece geometry, support structures, and fabrication material(s). Those of ordinary skill in the art of additive manufacturing will be able to select appropriate parameters for a fabrication process.

In addition to the parameters listed above, layer resolution contributes to piece strength and aesthetics. Initial printing resolution along the z-axis (vertical direction of manufacture) is typically 16, 32 or 52 microns. In some embodiments, printing resolution may be varied in 50 to 100 micron increments for every 500 microns added along the z-axis.

The interior fill of a matching piece can be selected to reduce part width, fabrication time, and/or material cost. In an embodiment, an interior portion of a matching piece is a sparse fill structure, such as a rastered structure or a honeycomb structure. In an embodiment, an interior portion of a matching piece comprises horizontal and/or vertical struts separated from each other by a distance selected from about 0.1 inches to about 1 inch, or from about 0.1 inches to 0.5 inches, or from 0.1 inches to 0.3 inches. Typically, air gaps exist between struts.

A cap layer (i.e., an external solid portion) may be used to cap off the internal honeycomb or rastered structure. The cap layer typically ranges from 4 layers to 20 layers of material. In some embodiments, a layer has a thickness between 0.02 inches to 0.5 inches.

In an embodiment, at least one proximate feature of the structure is included in the 3-D scan, and the 3-D model for the matching piece comprises one or more anchor features for mating with the at least one proximate feature.

In an embodiment, the at least one proximate feature of the structure is recessed or protruding. In an embodiment, a recessed proximate feature may be a hole in the structure.

In an aspect, a system for generating a 3-D model for a matching piece comprises a 3-D scanner adapted to perform a three-dimensional (3-D) scan of at least a portion of a structure where a piece of the structure has broken off, thereby generating scan data, and a comparison module adapted to compare the scan data against known 3-D model data for the structure to create a 3-D model for a matching piece. Suitable 3-D scanners are sold, for example, by Artec, Faro, Creaform and GOM. Suitable 3-D printers are sold, for example, by Stratasys, Ultimaker, EOS and 3D Systems. Suitable software includes, for example, Artec Studio, Spaceclaim, Solidworks, Geomagic DesignX, Stratasys-Insight, Stratasys-Grabcad and Materialise-Magics.

In an embodiment, the comparison module subtracts the scan data from the known 3-D model data to create a 3-D model for a matching piece.

In an embodiment, a system for generating a 3-D model for a matching piece further comprises a 3-D printer for fabricating the matching piece using the 3-D model for the matching piece. In an embodiment, the 3-D printer fabricates the matching piece by additive manufacturing.

BRIEF DESCRIPTION OF THE DRAWINGS

Illustrative embodiments of the present invention are described in detail below with reference to the attached drawings, wherein.

DETAILED DESCRIPTION

Figure 1:
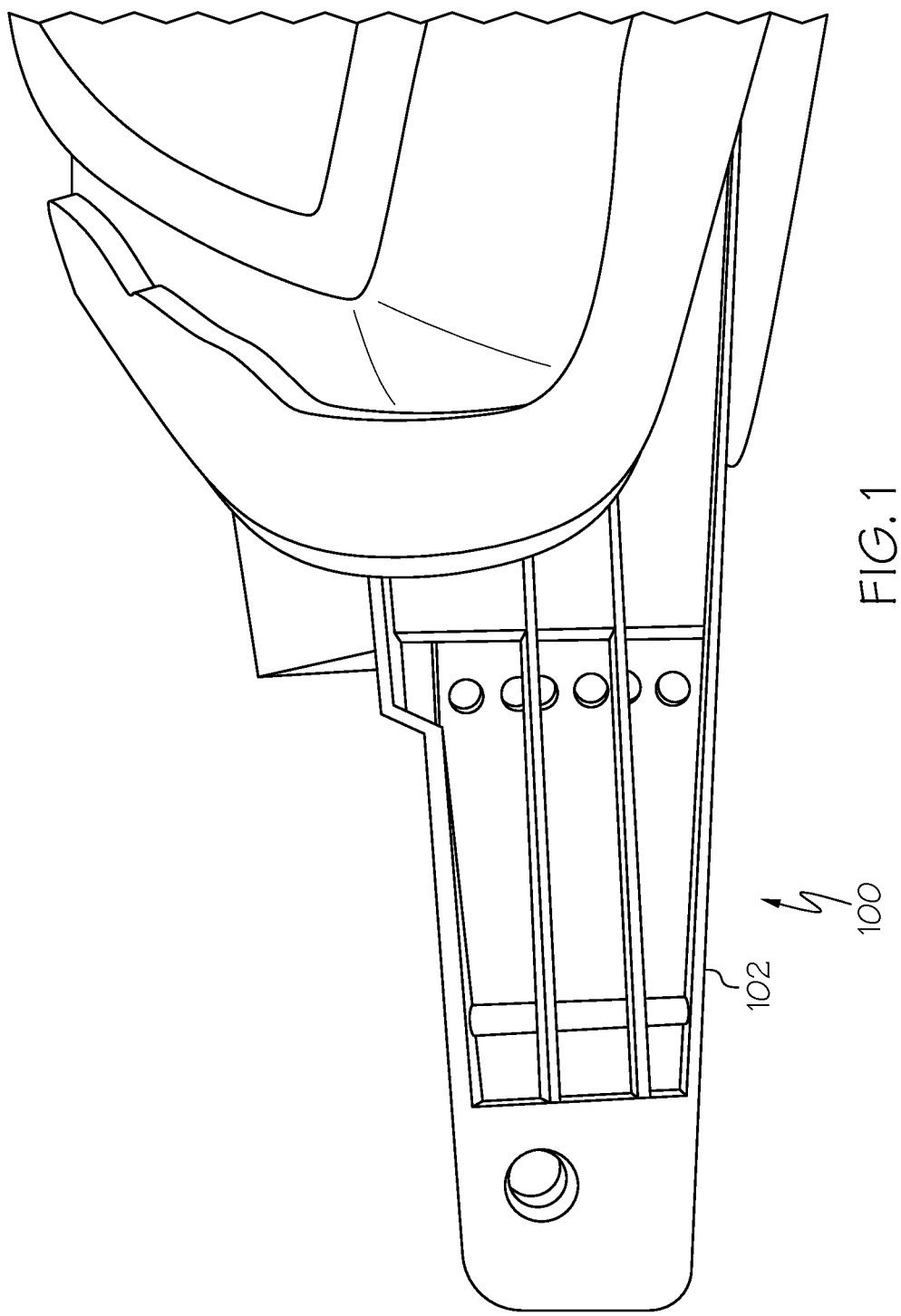
FIG. 1 is a top view of an undamaged headlight tab.

In general, the terms and phrases used herein have their art-recognized meaning, which can be found by reference to standard texts, journal references and contexts known to those skilled in the art. The following definitions are provided to clarify their specific use in the context of this description.

The terms "additive manufacturing" and "3-D printing" are used interchangeably herein to refer to manufacturing processes that may be used to produce functional, three-dimensional, complex objects, layer-by-layer, without molds or dies.

"Proximate" refers to the relative position of two or more objects, planes or surfaces. In an embodiment, a proximate feature is close in space to a broken edge or section of a structure. In an embodiment, a proximate feature of a structure is within three inches, or two inches, or one inch, or a half inch of a broken edge or section of the structure.

A "proximate feature" refers to a recessed or protruding portion of a structure forming an area where a matching piece may be secured to a broken structure. Exemplary proximate features include, but are not limited to, pillars, holes, slots, ledges, ribs, brackets, knobs, openings, tracks, wells and the like.

"Topography" refers to the three-dimensional shape of a surface. A "predetermined surface topography" is a three-dimensional surface shape that is set or determined prior to fabrication of a matching piece, achieved during fabrication of the matching piece, and substantially immutable after fabrication and during normal use of the matching piece.

An "irregular surface" is an uneven surface characterized by a roughness that does not vary in a regular or periodic manner. Irregular surfaces according to the present invention are typically characterized by macroscopic surface roughness, prominent surface features and/or jagged points. Irregular surfaces may be found on broken edges and matching pieces, for example, where a predetermined surface topography leads to fabrication of an irregular surface.

"Rastered" refers to a spatial arrangement including an array of cells arranged in rows and/or columns.

The terms "direct and indirect" describe the actions or physical positions of one component relative to another component. For example, a component that "directly" acts upon or touches another component does so without intervention from an intermediary. Contrarily, a component that "indirectly" acts upon or touches another component does so through an intermediary (e.g., a third component).

"Polymer" refers to a macromolecule composed of repeating structural units connected by covalent chemical bonds or the polymerization product of one or more monomers, often characterized by a high molecular weight. The term polymer includes homopolymers, or polymers consisting essentially of a single repeating monomer subunit. The term polymer also includes copolymers, or polymers consisting essentially of two or more monomer subunits, such as random, block, alternating, segmented, grafted, tapered and other copolymers. Useful polymers include organic polymers or inorganic polymers that may be in amorphous, semi-amorphous, crystalline or partially crystalline states. Crosslinked polymers having linked monomer chains are particularly useful for some applications. Polymers useable in the methods, devices and components include, but are not limited to, plastics, elastomers, thermoplastic elastomers, elastoplastics, thermoplastics and acrylates. Exemplary polymers include, but are not limited to, acetal polymers, biodegradable polymers, cellulosic polymers, fluoropolymers, nylons, polyacrylonitrile polymers, polyamide-imide polymers, polyimides, polyarylates, polybenzimidazole, polybutylene, polycarbonate, polyesters, polyetherimide, polyethylene, polyethylene copolymers and modified polyethylenes, polyketones, poly(methyl methacrylate), polymethylpentene, polyphenylene oxides and polyphenylene sulfides, polyphthalamide, polypropylene, polyethylene terephthalate, polyurethanes, styrenic resins, sulfone-based resins, vinyl-based resins, rubber (including natural rubber, styrene-butadiene, polybutadiene, neoprene, ethylene-propylene, butyl, nitrile, silicones), acrylic, nylon, polycarbonate, polyester, polyethylene, polypropylene, polystyrene, polyvinyl chloride, polyolefin or any combinations of these.

"Elastomer" refers to a polymeric material that can be stretched or deformed and returned to its original shape without substantial permanent deformation. Elastomers commonly undergo substantially elastic deformations. Useful elastomers include those comprising polymers, copolymers, composite materials or mixtures of polymers and copolymers. Useful elastomers include, but are not limited to, thermoplastic elastomers, styrenic materials, olefinic materials, polyolefin, polyurethane thermoplastic elastomers, polyamides, synthetic rubbers, polybutadiene, polyisobutylene, poly(styrene-butadiene-styrene), polyurethanes, polychloroprene and silicones. Exemplary elastomers include, but are not limited to silicon containing polymers such as polysiloxanes including poly(dimethyl siloxane) (i.e. PDMS and h-PDMS), poly(methyl siloxane), partially alkylated poly(methyl siloxane), poly(alkyl methyl siloxane) and poly(phenyl methyl siloxane), silicon modified elastomers, thermoplastic elastomers, styrenic materials, olefinic materials, polyolefin, polyurethane thermoplastic elastomers, polyamides, synthetic rubbers, polyisobutylene, poly(styrene-butadiene-styrene), polyurethanes, polychloroprene and silicones.

Figure 2:
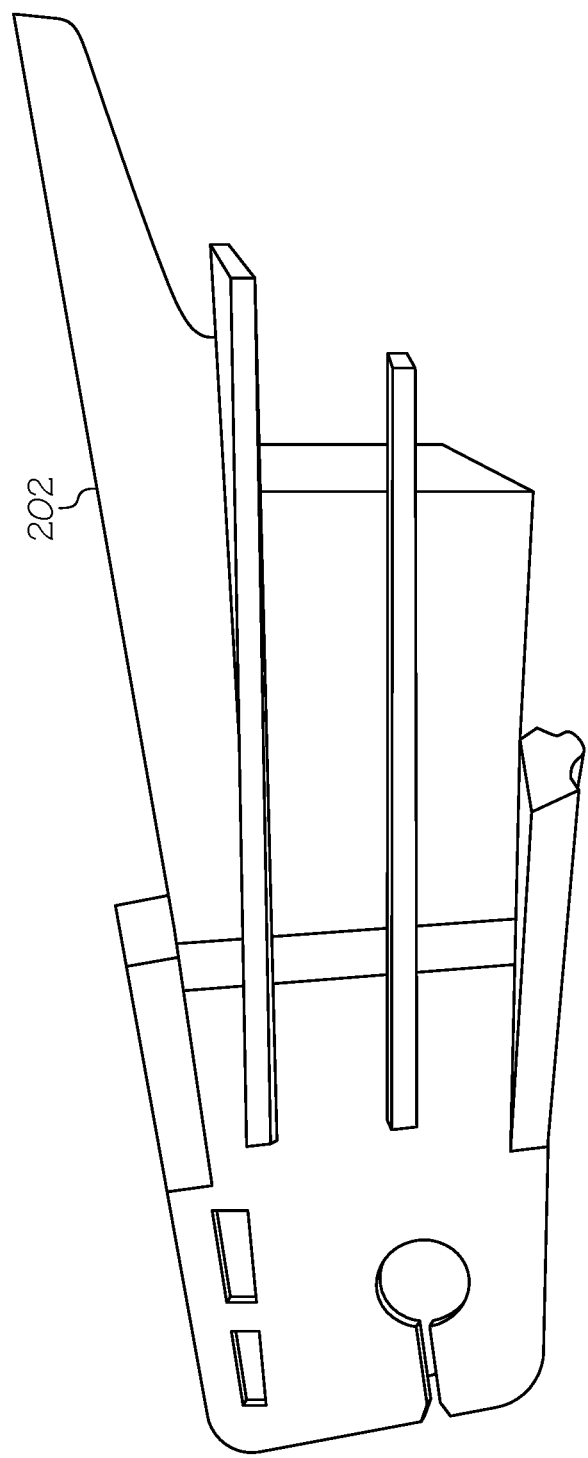
FIG. 2 illustrates a broken tab.
Figure 3:
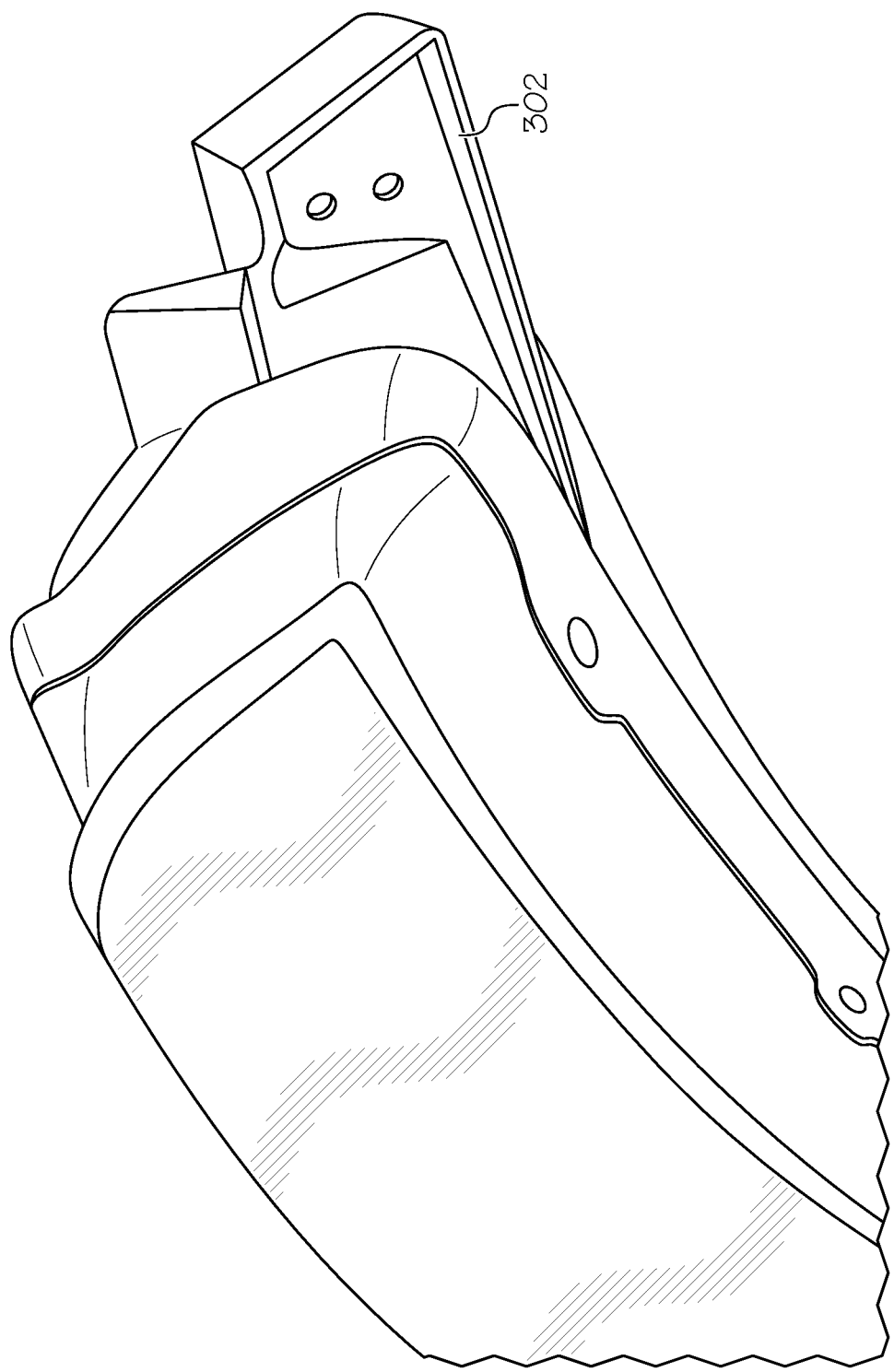
FIG. 3 illustrates a headlight with a frame from which the tab of FIG. 2 has broken.
Figure 4:
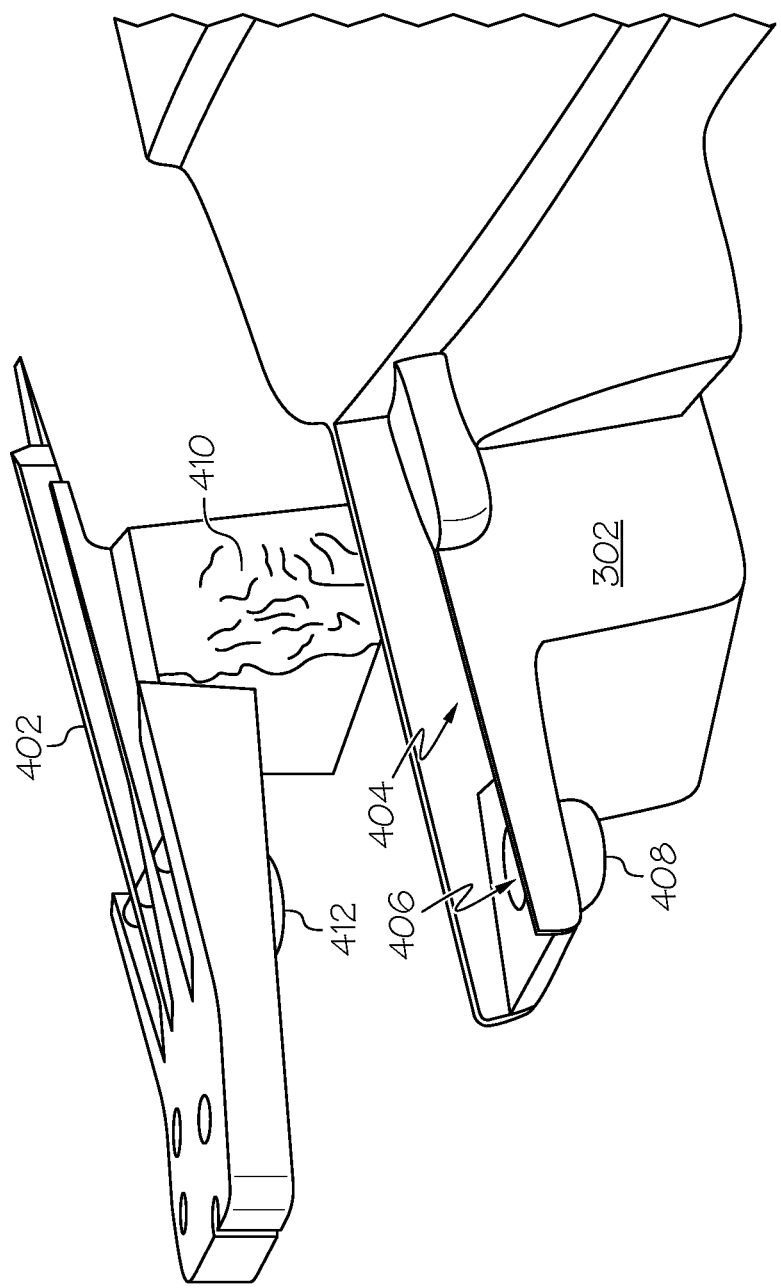
FIG. 4 is an exploded view showing a fabricated part before securement to the damaged headlight frame of FIG. 3.
Figure 5:
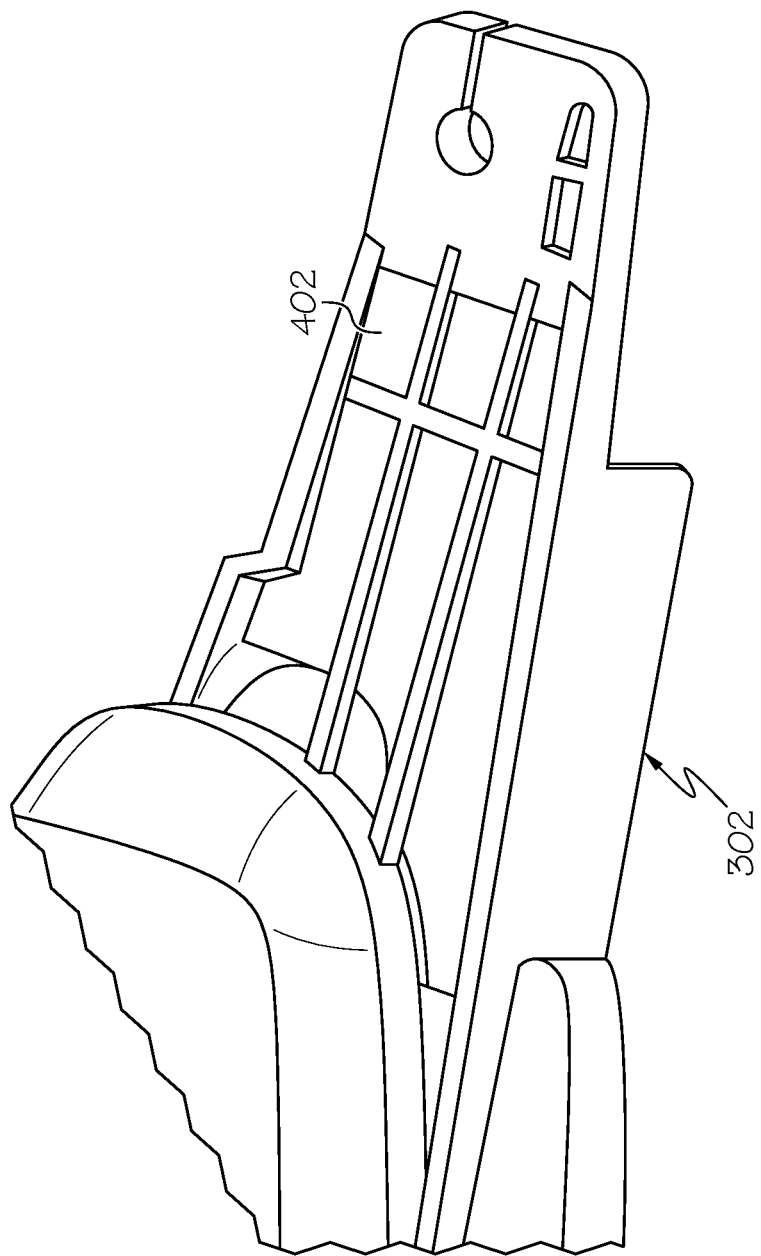
FIG. 5 is a schematic of the tab of the headlight after repair.

Example steps for repair of a vehicle component can be seen in FIGS. 1-5, wherein FIG. 1 is a top view of an undamaged headlight casing 100 including a tab 102; FIG. 2 is photograph of a broken tab 202; FIG. 3 is a photograph of a headlight with a frame 302 from which the tab of FIG. 2 has broken; FIG. 4 is an exploded view showing a fabricated part before securement to the damaged headlight frame of FIG. 3; and FIG. 5 is a schematic of the tab of the headlight after repair.

Figure 6:
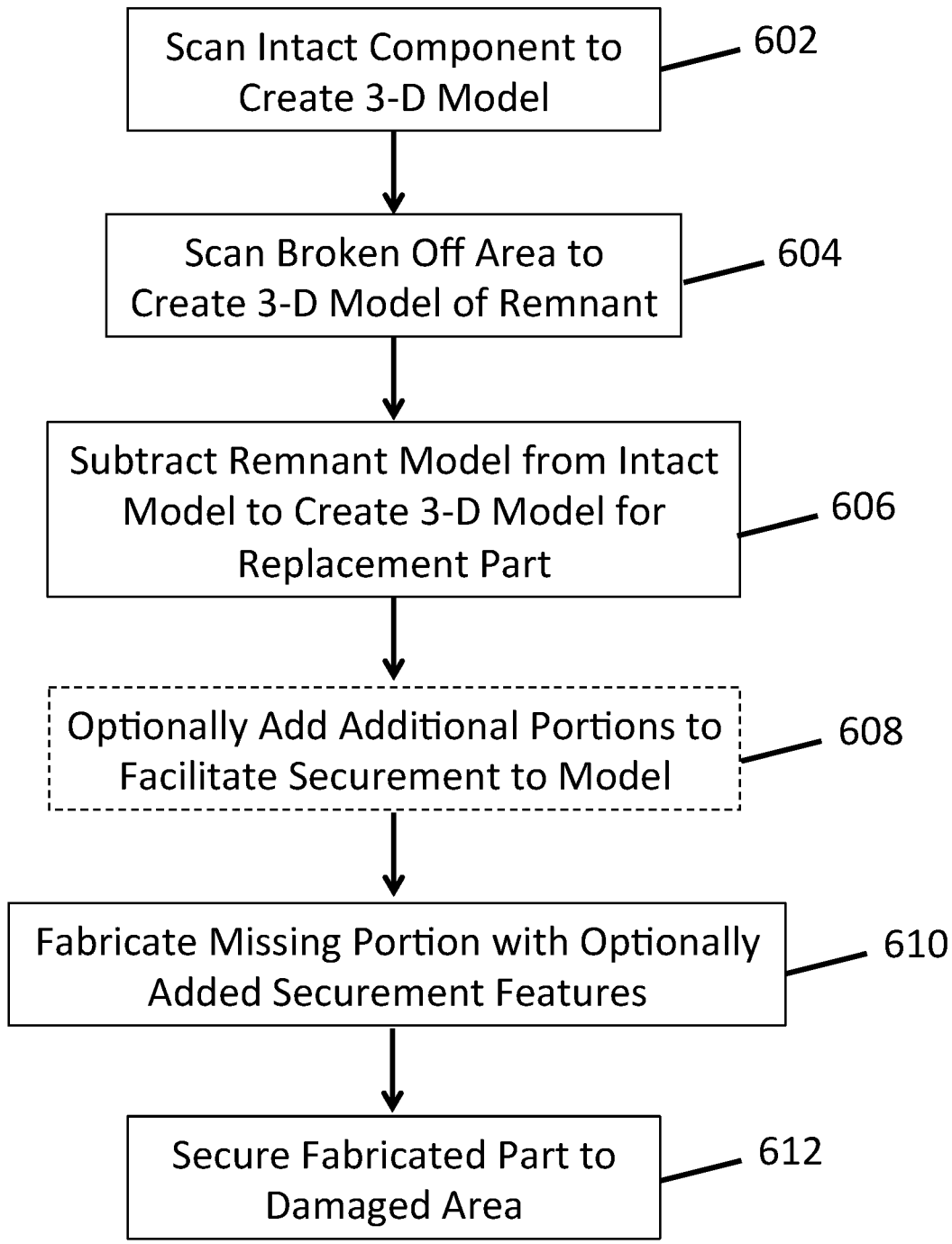
FIG. 6 is a flow diagram illustrating a method according to an embodiment of the invention.

FIG. 6 is a flow diagram illustrating a method according to an embodiment of the invention. In a first step 602 in FIG. 6, the entire intact component, or possibly a mere portion of an intact component (e.g., the portion shown in FIG. 1) is scanned to create an original equipment manufacturer (OEM) electronic 3-D model. Optionally, data for the entire intact component may be readily available, and step 602 may be unnecessary.

Once the OEM 3-D rendering or model of the intact component (or a relevant portion of the intact component) is obtained, it can be used to form a replacement part or matching piece that conforms to the areas from which the original part (e.g., a headlight mounting tab) has broken off (as can be seen in FIG. 2), but also to identify recesses, protrusions, or other sorts of features proximate the break-off area that can be used to aid in securement as will be described hereinafter.

In a next step, 604, the part intended for repair from which the part has broken off, see, e.g., FIG. 3, is then scanned to create a 3-D rendering of the remaining component, or a relevant portion of the remaining component.

In a step 606, processes are executed by a comparison module to compare the 3-D model created for the intact OEM part against the 3-D rendering of the remaining component to produce a 3-D model for a replacement part or matching piece (essentially a 3-D subtraction process). In a next step 608, additional portions are added to the 3-D replacement part model. For example, referring to FIG. 4, it can be seen that a recessed area 404, as well as an indentation 406 and a divot 408, which are defined by the headlight mounting frame structures, can be added to the 3-D replacement part model using known 3-D modeling software.

This consolidated 3-D rendering is used, in a step 610, to fabricate a replacement part 402 which provides not only features matched to the broken off structure (see FIG. 2), but also includes the added attachment protrusions/anchoring features 410 and 412 like the ones shown in FIG. 4. The end result is a structurally sound replacement part/matching piece.

The replacement part 402 is, in step 612, secured to the damaged portion of the headlight frame using epoxy or some other form of adhesive (or alternatively one or more fasteners, force fit, a snap fit, or some other arrangement), which may be included in a kit for repairing a broken structure. The final product can be seen in FIG. 5.

Replacement parts/matching pieces created by the disclosed methods could be created to replace many kinds of broken parts, including but not limited to automotive parts.

Figure 7:
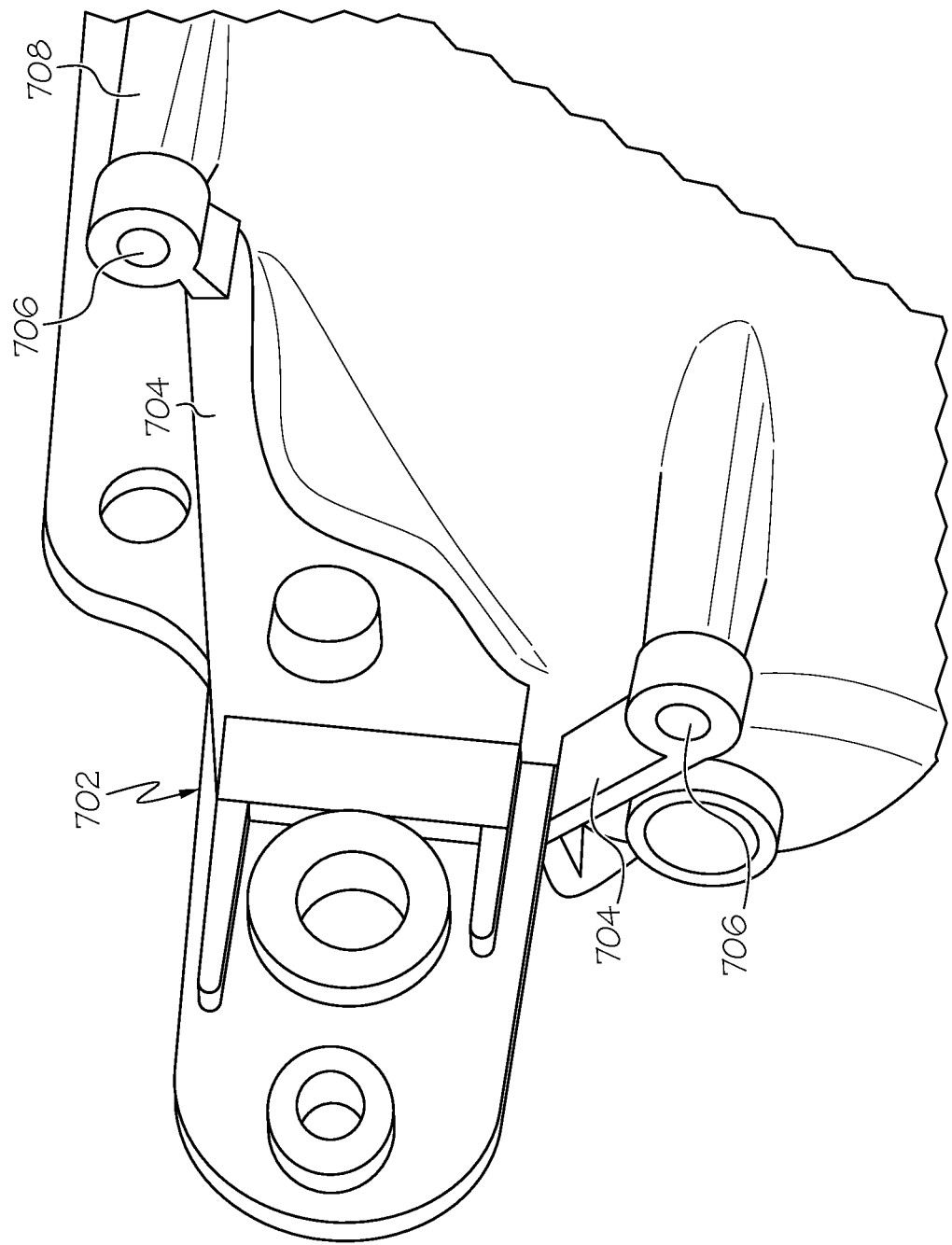
FIG. 7 illustrates various embodiments of the invention.

FIG. 7 illustrates various embodiments of the invention. Referring to these figures, the replacement part 702 is adapted to conform to the shape of the broken off area according to the processes described in FIG. 6. Additionally, however, the process is altered to add extensions/anchor features 704 and 712 to areas where receiving holes 706 are established. The holes 706 are made to cooperate with outcropped posts 708 which already exist in the headlight housing, and are adapted to receive fasteners. Epoxy may still be used on at least some surfaces where the fabricated replacement part 702 and damaged and other existing headlight surfaces interface (e.g., at interface 710).

Alternatively, a kit could be provided including the replacement part/matching piece, instructions, and optionally epoxy, fasteners (if needed like with the FIG. 7A-C version) and anything else needed to complete the repair. Further, a complete system could be provided including the 3-D scanning device, a 3-D printer, as well as the necessary software needed to conduct custom repairs. Alternatively, a repair kit could be transmitted to an entity where the kit includes some or all of the replacement tabs/matching pieces necessary for each tab on a particular light assembly model (one or more tabs, e.g., three). The receiving entity might be an individual consumer (e.g., vehicle owner) or could alternatively be an insurance company, body shop, or some other entity responsible for repairing a broken part.

Figure 8:
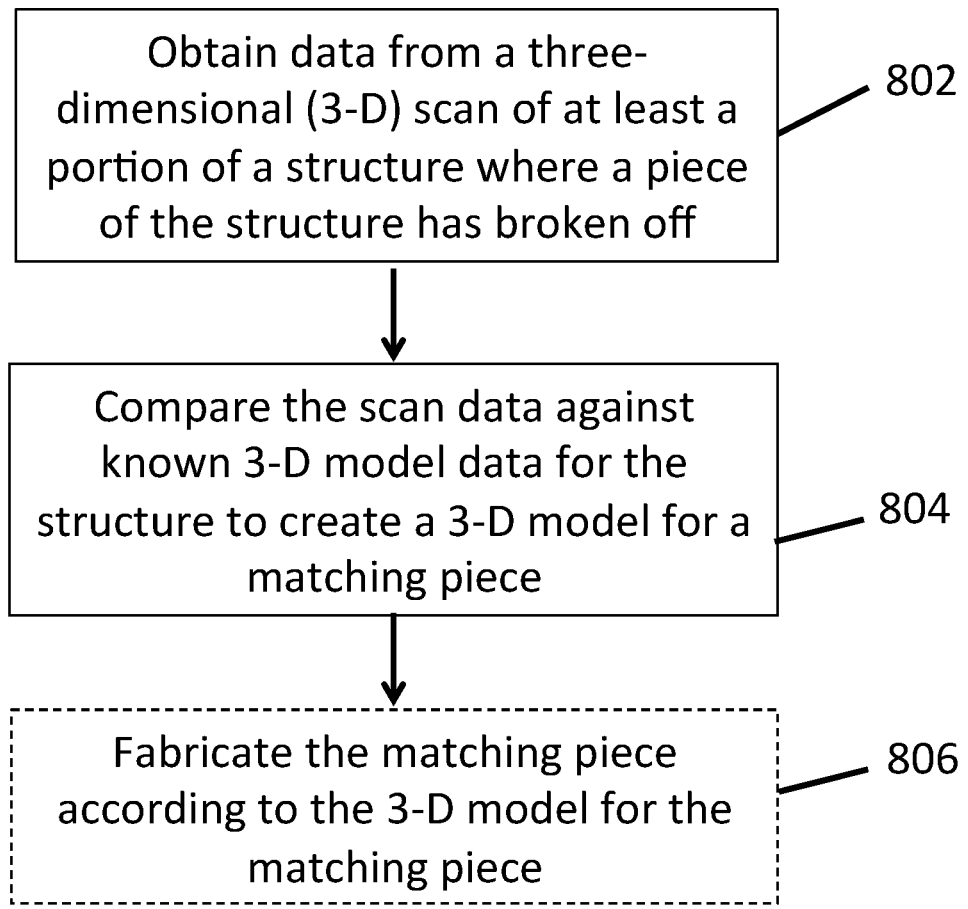
FIG. 8 is a flow diagram illustrating a method according to an embodiment of the invention.

FIG. 8 is a flow diagram illustrating a method for generating a 3-D model for a matching piece according to an embodiment of the invention. In step 802, data is obtained from a three-dimensional (3-D) scan of at least a portion of a structure where a piece of the structure has broken off. In step 804, the scan data is compared against known 3-D model data for the structure to create a 3-D model for a matching piece. In optional step 806, the matching piece is fabricated according to the 3-D model for the matching piece.

Many different arrangements of the various components depicted, as well as components not shown, are possible without departing from the spirit and scope of the present invention. Embodiments of the present invention have been described with the intent to be illustrative rather than restrictive. Alternative embodiments within the spirit and scope of the disclosed systems and methods will become apparent to those skilled in the art. A skilled artisan may develop alternative means of implementing the aforementioned systems and methods without departing from the scope of the present invention.

It will be understood that certain features and subcombinations are of utility and may be employed without reference to other features and subcombinations and are contemplated to be within the scope of the claims. Not all steps listed in the various figures need be carried out in the specific order described.

STATEMENTS REGARDING INCORPORATION BY REFERENCE AND VARIATIONS

All references cited throughout this application, for example patent documents including issued or granted patents or equivalents; patent application publications; and non-patent literature documents or other source material; are hereby incorporated by reference herein in their entireties, as though individually incorporated by reference.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods and devices useful for the present methods and devices can include a large number of optional composition and processing elements and steps.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a tab" includes a plurality of such tabs and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described. Nothing herein is to be construed as an admission that the invention is not entitled to antedate such disclosure by virtue of prior invention.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements or limitation or limitations which is/are not specifically disclosed herein.

All art-known functional equivalents of materials and methods are intended to be included in this disclosure. The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments and optional features, modification and variation of the concepts herein disclosed can be resorted to by those skilled in the art, and that such modifications and variations are considered to be within the scope of this invention as defined by the appended claims.

What is claimed is:

1. A matching piece for a broken mounting tab of a vehicle component, said matching piece existing apart from said broken mounting tab and comprising at least one surface having a predetermined surface topography matching an irregular surface of the broken mount tab, wherein the matching piece and one or more anchor features form a unitary body, said one or more anchor features insertably mate with a proximate feature of the broken mounting tab, and wherein the proximate feature is a concave receptacle that is at least partially enclosed on all sides except one, which forms an opening that receives the one or more anchor features.

2. The matching piece of claim 1, wherein an interior portion of the matching piece comprises a rastered structure or a honeycomb structure.

3. The matching piece of claim 1, wherein said matching piece comprises a material selected from the group consisting of a thermoplastic, a photopolymer resin, an elastomer, a metal, a metal alloy and combinations thereof.

4. The matching piece of claim 1, wherein the matching piece forms part of a structure selected from the group consisting of a headlight casing, a tail light casing, an interior light casing, a dashboard, a glove box, a compartment hatch, a steering wheel, a shift knob and a sun visor.

5. The matching piece of claim 1 prepared by a method comprising:
obtaining data from a three-dimensional (3-D) scan of at least a portion of the broken mounting tab where a piece of an original mounting tab has broken off; and
comparing the scan data against known 3-D model data for the original mounting tab to create a 3-D model for the matching piece, wherein the proximate feature of the broken mounting tab is included in the 3-D scan, and the 3-D model for the matching piece comprises the one or more anchor features that insertably mate with the proximate feature.

6. The matching piece of claim 5, wherein the step of comparing the scan data against the known 3-D model data comprises subtracting the scan data from the known 3-D model data.

7. The matching piece of claim 5, further comprising a step of fabricating the matching piece according to the 3-D model for the matching piece.

8. The matching piece of claim 7, wherein the step of fabricating is selected from the group consisting of additive manufacturing, subtractive manufacturing, computer numerical control (CNC) machining, laser etching and combinations thereof.

9. The matching piece of claim 1, wherein said at least one surface and said irregular surface are contactable with a mean tolerance less than or equal to 0.015 inches.

10. The matching piece of claim 9, wherein the mean tolerance is less than or equal to 0.005 inches.

11. The matching piece of claim 1 further comprising a hole having a central axis.

12. The matching piece of claim 11, wherein the one or more anchor feature inserts into the opening of the proximate feature along an axis parallel with the central axis.

13. The matching piece of claim 1 further comprising a bolt hole and a slit connecting the bolt hole with an outer edge of the matching piece.

* * * * *